(12) United States Patent
Zhang et al.

(10) Patent No.: US 12,523,517 B2
(45) Date of Patent: Jan. 13, 2026

(54) DIGITAL LOAD CELL AND WEIGHING SYSTEM

(71) Applicants: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Ying Zhang, Changzhou (CN); Hongzhi Lin, Changzhou (CN); Jianwei Wu, Changzhou (CN); Miao Xu, Changzhou (CN)

(73) Assignees: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghaj) Co., Ltd., Shanghai (CN)

( * ) Notice: Subject to any disclaimer, the term of this patent is extended or adjusted under 35 U.S.C. 154(b) by 281 days.

(21) Appl. No.: 18/280,341

(22) PCT Filed: Apr. 15, 2022

(86) PCT No.: PCT/CN2022/087207
§ 371 (c)(1),
(2) Date: Sep. 5, 2023

(87) PCT Pub. No.: WO2022/199713
PCT Pub. Date: Sep. 29, 2022

(65) Prior Publication Data
US 2024/0077352 A1  Mar. 7, 2024

(30) Foreign Application Priority Data
Mar. 25, 2021  (CN) .......................... 202110321918.6

(51) Int. Cl.
*G01G 3/14* (2006.01)
*G01G 3/147* (2006.01)

(52) U.S. Cl.
CPC ........... *G01G 3/1418* (2013.01); *G01G 3/147* (2013.01)

(58) Field of Classification Search
CPC ............................ G01G 3/1418; G01G 3/147
(Continued)

(56) References Cited

U.S. PATENT DOCUMENTS 4,815,547 A * 3/1989 Dillon ...................... G01G 3/18
73/1.13
5,004,958 A * 4/1991 Hirata ..................... H05B 41/32
315/240
(Continued)

FOREIGN PATENT DOCUMENTS

CN          103888140 A      6/2014
CN          106253451 A      12/2016
(Continued)

*Primary Examiner* — Jacques M Saint Surin
(74) *Attorney, Agent, or Firm* — Standley Law Group LLP; Jeffrey S. Standley; Adam J. Smith

(57) ABSTRACT

A digital load cell includes: a strain bridge including a Wheatstone bridge formed by connecting four resistive strain gauges and a temperature sensing resistance element connected in series to the Wheatstone bridge. An analog-to-digital conversion circuit excites the strain bridge, and includes a plurality of input channels and an output terminal. The input channels receive feedback signals from the strain bridge, and the output terminal outputs the feedback signals after analog-to-digital conversion. A signal processor includes a load force calculation unit and a state information matrix calculation unit. The load force calculation unit calculates a differential voltage and a compensation function based on the feedback signals obtained from the output terminal, and calculates a load force value based on the (Continued)

differential voltage and the compensation function. The digital load cell and related weighing system can provide comprehensive and effective real-time health state monitoring for the digital load cell.

11 Claims, 2 Drawing Sheets

(58) Field of Classification Search
USPC .......................................................... 177/211
See application file for complete search history.

(56) References Cited

U.S. PATENT DOCUMENTS

| | | | | |
|---|---|---|---|---|
| 5,076,375 A * | 12/1991 | Dillon | ..................... | B66C 23/48 |
| | | | | 177/25.19 |
| 5,230,392 A * | 7/1993 | Tremblay | ............... | G01G 19/08 |
| | | | | 177/137 |
| 5,841,077 A * | 11/1998 | Kolaci | ............... | G01G 23/3707 |
| | | | | 177/210 R |
| 7,592,552 B2 * | 9/2009 | Duppre | ................ | G01G 19/005 |
| | | | | 177/199 |
| 2007/0112274 A1 | 5/2007 | Heitzmann et al. | | |
| 2017/0205272 A1 | 7/2017 | Zhang et al. | | |
| 2023/0392973 A1 * | 12/2023 | Bijkerk | .................... | G01G 3/14 |

FOREIGN PATENT DOCUMENTS

| | | | | |
|---|---|---|---|---|
| CN | 112985571 | * | 6/2021 | ........... G01G 3/1418 |
| CN | 112985571 A | * | 6/2021 | ........... G01G 3/1418 |
| WO | WO-2020011319 A1 | * | 1/2020 | ........... G01G 3/1414 |
| WO | WO-2022199713 A1 | * | 9/2022 | ............. G01G 23/01 |

* cited by examiner

DIGITAL LOAD CELL AND WEIGHING SYSTEM

TECHNICAL FIELD

The present invention relates to the field of load cell design technologies, and in particular to a digital load cell and a weighing system.

BACKGROUND ART

In modern industrial production procedures, weight information has often become a key information source and control target. For example, in a vehicle scale system, weight information is final output data required. For a filling production line, weight information becomes a control target of filling production procedures. Therefore, the reliability and precision of weighing are of great significance.

With the development of digital and information technologies, traditional weighing systems start to step into a digital weighing system era. A circuit with a high-precision analog-to-digital conversion function and a digital processing capability is built in a sensor to convert load force information of the sensor into a digital signal. One or more digital load cells exchange data and instructions with terminal devices such as an instrument and an industrial personal computer in a wired or wireless communication manner to form a weighing communication topology network together to send formatted weighing data to the terminal devices such as the instrument and the industrial personal computer for final processing and display.

In an existing digital weighing system, terminal devices such as an instrument and an industrial personal computer are the core of data processing, and process data received from the digital load cell into weighing data of the weighing system. In the meantime, overload information, temperature data, and calibration information of a digital sensor node are recorded. However, important information such as the complex usage process, network health conditions, service life, and weighing element states of the digital weighing system cannot be monitored, analysed, and diagnosed. With the increase of the service time of the digital weighing system, some faults and problems may inevitably occur in the load cell, which makes the state of the sensor unstable and the reliability and precision reduced. Since the digital weighing system is composed of various digital sensors, a problem of a single load cell may result in a reduced reliability and precision of the entire digital weighing system.

SUMMARY OF THE INVENTION

In view of the foregoing problem in the prior art, the present invention proposes a digital load cell and a weighing system, which can provide comprehensive and effective real-time health state monitoring for the digital load cell.

Specifically, the present invention proposes a digital load cell, the digital load cell including:
  a strain bridge including a Wheatstone bridge formed by connecting four resistive strain gauges and a temperature sensing resistance element connected in series to the Wheatstone bridge;
  an analog-to-digital conversion circuit that excites the strain bridge, where the analog-to-digital conversion circuit includes a plurality of input channels and an output terminal, the input channels are configured to receive feedback signals from the strain bridge, and the output terminal is configured to output the feedback signals after analog-to-digital conversion;
  a signal processor including a load force calculation unit and a state information matrix calculation unit, where the load force calculation unit calculates a differential voltage and a compensation function based on the feedback signals obtained from the output terminal of the analog-to-digital conversion circuit, and calculates a load force value based on the differential voltage and the compensation function, and the state information matrix calculation unit calculates real-time voltage values of the four resistive strain gauges based on the feedback signals obtained from the output terminal of the analog-to-digital conversion circuit, and calculates a state information matrix based on the real-time voltage values and the load force value; and
  a state monitoring circuit configured to obtain and transfer state monitoring information of the digital load cell to the signal processor.

According to an embodiment of the present invention, the analog-to-digital conversion circuit has a reference voltage terminal and a ground terminal, and the analog-to-digital conversion circuit excites the strain bridge via the reference voltage terminal and the ground terminal.

According to an embodiment of the present invention, the Wheatstone bridge includes a first strain gauge, a second strain gauge, a third strain gauge, and a fourth strain gauge, the analog-to-digital conversion circuit includes at least a first input channel, a second input channel, and a third input channel, a first feedback signal is drawn out between the temperature sensing resistance element and the Wheatstone bridge and input to the first input channel, a second feedback signal is drawn out between the first strain gauge and the second strain gauge and input to the second input channel, and a third feedback signal is drawn out between the third strain gauge and the fourth strain gauge and input to the third input channel.

According to an embodiment of the present invention, the load force calculation unit calculates the differential voltage $VS=VSP-VSN$ based on the second feedback signal VSP and the third feedback signal VSN, calculates the compensation function $f(VBG, VSP, VSN)$ based on the first feedback signal VBG, the second feedback signal VSP, and the third feedback signal VSN, and calculates the load force value $Fn=(VSP-VSN)*K+f(VBG, VSP, VSN)$ based on the differential voltage and the compensation function, where K is a strain force coefficient constant of the digital load cell.

According to an embodiment of the present invention, the state information matrix calculation unit calculates the real-time voltage values of the four resistive strain gauges based on the first feedback signal VBG, the second feedback signal VSP, and the third feedback signal VSN, and calculates the state information matrix $St=Matrix(VSP, VSN, VBG, Fn, T, Sn)$ based on the real-time voltage values and the load force value Fn, the real-time temperature information T, and the state monitoring information Sn sent by the state monitoring circuit.

According to an embodiment of the present invention, the signal processor further includes a state information matrix threshold database, the state information matrix threshold database stores state information matrix thresholds STH corresponding to different application states of the digital load cell, and the signal processor compares the state information matrix St with the state information matrix thresholds STH to obtain fault information of the digital load cell.

According to an embodiment of the present invention, the signal processor detects a current state of the digital load cell based on the load force value Fn and the state information matrix St, and corrects a deviation between the load force value Fn and an actual load force value generated due to the current state.

According to an embodiment of the present invention, the digital load cell further includes a power supply module, where the state monitoring circuit includes a power supply monitoring circuit, and the power supply monitoring circuit monitors an input voltage and an output voltage of the power supply module.

According to an embodiment of the present invention, the state monitoring circuit further includes a strain bridge monitoring circuit, and the strain bridge monitoring circuit monitors an excitation voltage of the strain bridge.

According to an embodiment of the present invention, the state monitoring circuit further includes a reference load circuit, so that the analog-to-digital conversion circuit can be switched to the reference load circuit.

The present invention further provides a weighing system, the weighing system including:

- a load cell array including the foregoing digital load cell;
- a collection device configured to collect environmental information of the load cell array, where the collection device includes a monitoring device and a built-in circuit; and
- a control terminal connected to each electronic load cell in the load cell array via a signal cable to obtain a load force value Fn and a state information matrix St of the electronic load cell, where the control terminal receives the environmental information collected by the collection device.

According to an embodiment of the present invention, the weighing system further includes a power cable, where the control terminal is connected to the load cell array via the power cable.

According to an embodiment of the present invention, the control terminal includes a cable monitoring unit, where the cable monitoring unit is configured to monitor a current and a resistance of the power cable, and the cable monitoring unit is configured to monitor a voltage and an impedance of the signal cable.

The present invention provides the digital load cell and the weighing system, which can provide comprehensive and effective real-time health state monitoring for the digital load cell.

It should be understood that the above general description and the following detailed description of the present invention are both exemplary and illustrative, and are intended to provide further explanations for the present invention as claimed in the claims.

BRIEF DESCRIPTION OF THE DRAWINGS

The accompanying drawings are included to provide a further understanding of the present invention and are incorporated in and constitute a part of the present application, show the embodiments of the present invention, and serve to, together with the description, explain the principles of the present invention. In the drawings.

Figure 1:
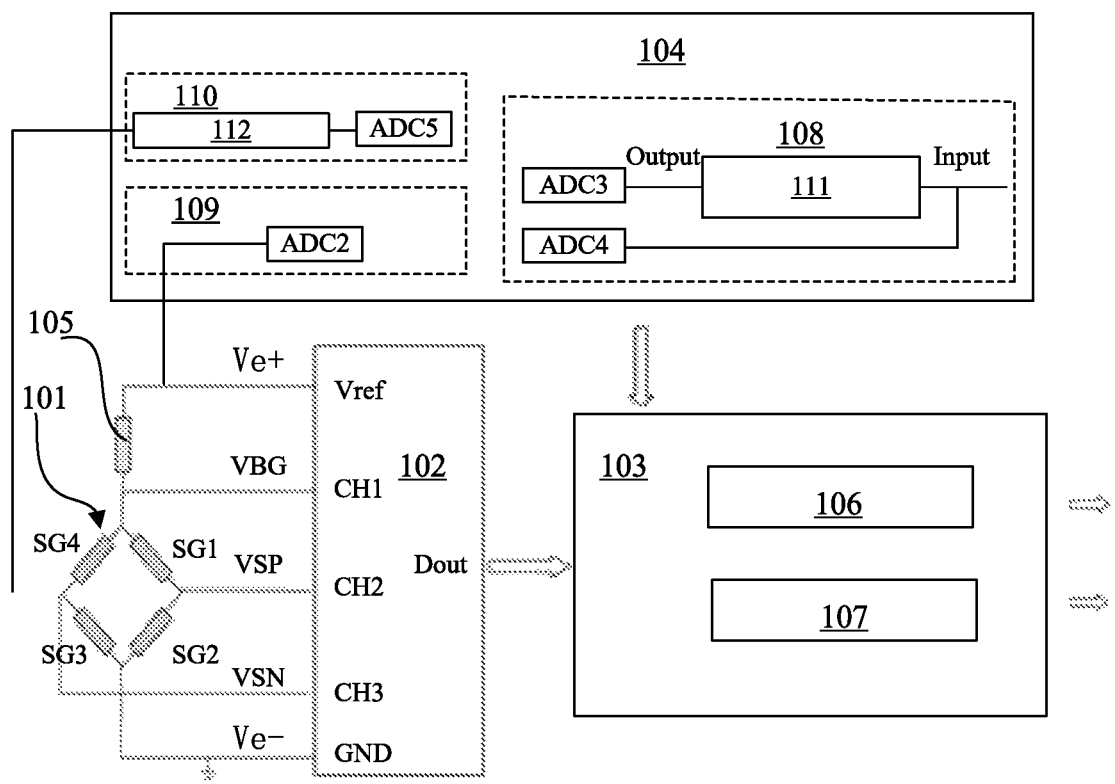
FIG. 1 is a schematic structural diagram of a digital load cell according to an embodiment of the present invention.

The above drawings include the following reference numerals:

| | | | |
|---|---|---|---|
| Digital load cell | 100 | Strain bridge | 101 |
| Analog-to-digital conversion circuit | 102 | Signal processor | 103 |
| State monitoring circuit | 104 | Temperature sensing resistance element | 105 |
| Load force calculation unit | 106 | State information matrix calculation unit | 107 |
| Power supply monitoring circuit | 108 | Strain bridge monitoring circuit | 109 |
| Reference load circuit | 110 | Power supply module | 111 |
| Reference load | 112 | | |
| Weighing system | 200 | Load cell array | 201 |
| Collection device | 202 | Control terminal | 203 |
| Signal cable | 204 | Power cable | 205 |

DETAILED DESCRIPTION OF EMBODIMENTS

It should be noted that, in the case of no conflict, the embodiments and the features thereof in the present application can be combined with each other.

The technical solutions in the embodiments of the present application will be clearly and completely described below in conjunction with the drawings in the embodiments of the present application. Apparently, the described embodiments are merely some rather than all of the embodiments of the present application. The following description of at least one exemplary embodiment is merely illustrative, and in no way serves as any limitation on the present application and application or use thereof. All other embodiments derived by those of ordinary skill in the art based on the embodiments of the present application without creative efforts fall within the protection scope of the present application.

It should be noted that the terms used herein are merely for describing specific implementations, and are not intended to limit the exemplary implementations according to the present application. As used herein, unless the context clearly indicates otherwise, the singular forms are intended to include the plural forms as well. Moreover, it should also be understood that when the terms "include(s)" and/or "comprise(s)" are used in this specification, it indicates the presence of features, steps, operations, devices, components, and/or combinations thereof.

Unless specifically stated otherwise, the relative arrangement of components and steps, numerical expressions and numerical values set forth in these embodiments do not limit the scope of the present application. In addition, it should be understood that, for ease of description, the sizes of various parts shown in the drawings are not drawn to scale. The technologies, methods, and devices known to those of ordinary skill in the related art may not be discussed in detail, but where appropriate, the technologies, methods, and devices should be regarded as part of the authorization specification. In all examples shown and discussed here, any specific value should be interpreted as merely exemplary and not as limiting. Therefore, other examples of the exemplary embodiment may have different values. It should be noted that similar reference signs and letters refer to similar items in the following drawings. Therefore, once a specific item is defined in one of the drawings, it need not be further discussed in subsequent drawings.

In the description of the present application, it should be understood that, an orientation or position relationship indicated by orientation terms such as "front, rear, upper, lower, left, and right", "transverse, longitudinal, vertical, and horizontal", and "top and bottom" is usually based on an orientation or position relationship shown in the drawings, which is only for the convenience of describing the present application and simplifying the description. Unless otherwise stated, these orientation terms do not indicate or imply that an apparatus or element referred to must have a specific orientation or be constructed and operated in a specific orientation, so that the orientation terms cannot be understood as a limitation of the protection scope of the present application; and the orientation terms "inner and outer" refer to the inside and outside relative to the contour of each component itself.

For the convenience of description, spatially relative terms such as "on", "above", "on the top surface", and "upper" can be used herein to describe a spatial position relationship between a device or a feature shown in the figure and other devices or features. It should be understood that spatially relative terms are intended to include different orientations in use or operation in addition to the orientation of the device described in the figure. For example, if the device in the figure is inverted, the device described as "on other devices or structures" or "above other devices or structures" will then be positioned as "under other devices or structures" or "below other devices or structures". Therefore, the exemplary term "above" may include two orientations "above" and "below". The device may also be positioned in other different manners (rotated by 90 degrees or in other orientations), and a spatially relative description used here is explained accordingly.

In addition, it should be noted that the use of words such as "first" and "second" to define parts is merely for the convenience of distinguishing between corresponding parts. Unless otherwise stated, the above words have no special meaning and therefore cannot be understood as a limitation to the protection scope of the present application. Furthermore, although the terms used in the present application are selected from well-known common terms, some of the terms mentioned in the specification of the present application may have been selected by the applicant according to his or her determination, and the detailed meaning thereof is described in the relevant section described herein. Furthermore, the present application must be understood, not simply by the actual terms used but also by the meanings encompassed by each term.

FIG. 1 is a schematic structural diagram of a digital load cell according to an embodiment of the present invention. As shown in the figure, the digital load cell 100 mainly includes a strain bridge 101, an analog-to-digital conversion circuit 102, a signal processor 103, and a state monitoring circuit 104.

The strain bridge 101 includes a Wheatstone bridge and a temperature sensing resistance element 105 connected in series to the Wheatstone bridge. The Wheatstone bridge is formed by connecting four resistive strain gauges.

The analog-to-digital conversion circuit 102 excites the strain bridge 101. The analog-to-digital conversion circuit 102 includes a plurality of input channels and an output terminal Dout. The input channels are configured to receive feedback signals from the strain bridge 101, and the output terminal Dout is configured to output the feedback signals after analog-to-digital conversion.

The signal processor 103 mainly includes a load force calculation unit 106 and a state information matrix calculation unit 107. The load force calculation unit 106 calculates a differential voltage and a compensation function based on the feedback signals obtained from the output terminal Dout of the analog-to-digital conversion circuit 102, and calculates a load force value based on the differential voltage and the compensation function. The differential voltage VS reflects deformation of a resistive strain gauge, that is, a load force applied to an elastomer of the digital load cell 100. The state information matrix calculation unit 107 calculates real-time voltage values of the four resistive strain gauges based on the feedback signals obtained from the output terminal Dout of the analog-to-digital conversion circuit 102, and calculates a state information matrix based on the real-time voltage values and the load force value.

The state monitoring circuit 104 monitors a key parameter that affects the performance of the digital load cell 100 in real time, and is mainly configured to obtain and transfer state monitoring information of the digital load cell 100 to the signal processor 103. The state monitoring information provided by the state monitoring circuit 104 is used to correct a deviation of the weighing data that is caused due to a current state, such as slant correction, angle difference correction, etc. for the digital load cell 100.

Preferably, the analog-to-digital conversion circuit 102 has a reference voltage terminal Vref and a ground terminal GND. The analog-to-digital conversion circuit 102 outputs a high voltage Ve+ through the reference voltage terminal Vref, and outputs a low voltage Ve− through the ground terminal GND, so that an excitation voltage (Ve+, Ve−) is applied across the strain bridge 101.

Preferably, the Wheatstone bridge includes a first strain gauge SG1, a second strain gauge SG2, a third strain gauge SG3, and a fourth strain gauge SG4. The analog-to-digital conversion circuit 102 includes at least a first input channel CH1, a second input channel CH2, and a third input channel CH3. A first feedback signal VBG is drawn out between the temperature sensing resistance element 105 and the Wheatstone bridge and input to the first input channel CH1. A second feedback signal VSP is drawn out between the first strain gauge SG1 and the second strain gauge SG2 and input to the second input channel CH2. A third feedback signal VSN is drawn out between the third strain gauge SG3 and the fourth strain gauge SG4 and input to the third input channel CH3. It is easily understood that the second feedback signal VBG reflects a voltage of the Wheatstone bridge composed of the resistive strain gauges. In addition, because the strain bridge 101 is excited by a regulated voltage source, the second feedback signal VBG can also reflect a voltage of the temperature sensing resistance element 105, and further reflect temperature information of the electronic load cell.

Preferably, the load force calculation unit 106 calculates a differential voltage VS=VSP−VSN based on the second feedback signal VSP and the third feedback signal VSN. The compensation function f(VBG, VSP, VSN) is calculated based on the first feedback signal VBG, the second feedback signal VSP, and the third feedback signal VSN. The load force value Fn=(VSP−VSN)*K+f(VBG, VSP, VSN) is calculated based on the differential voltage and the compensation function, where K is a strain force coefficient constant of the digital load cell 100.

Preferably, the state information matrix calculation unit 107 calculates the real-time voltage values of the four resistive strain gauges based on the first feedback signal VBG, the second feedback signal VSP, and the third feedback signal VSN, and calculates the state information matrix St=Matrix(VSP, VSN, VBG, Fn, T, Sn) based on the real-time voltage values and the load force value Fn, the real-time temperature information T, and the state monitoring information Sn sent by the state monitoring circuit 104. It should be noted that for the first feedback signal VBG, the second feedback signal VSP, and the third feedback signal VSN, since one node of the Wheatstone bridge is connected to a zero potential, an arithmetic combination of these three voltages can reflect voltages of the four resistive strain gauges, and further reflect state information of the electronic load cell.

Preferably, the signal processor 103 further includes a state information matrix threshold database (not shown in the figure). The state information matrix threshold database stores state information matrix thresholds STH corresponding to different application states of the digital load cell 100. The signal processor 103 compares the state information matrix St with the state information matrix thresholds STH to obtain fault information of the digital load cell 100.

Preferably, the signal processor 103 detects a current state of the digital load cell 100 based on the load force value Fn and the state information matrix St, and determines a deviation between the load force value Fn and an actual load force value generated due to the current state.

The electronic load cell obtains the real-time voltage values of the four resistive strain gauges through the arithmetic combination of the first feedback signal VBG, the second feedback signal VSP, and the third feedback signal VSN, and may obtain the state information matrix St=Matrix(VSP, VSN, VBG, Fn, T, Sn) based on multi-dimensional information such as the load force value Fn, the temperature information, and the state information of the load cell. Because of the structure and characteristics of the electronic load cell, there is a consistency between the state information matrix and comprehensive information such as a load force actually applied to the sensor, the temperature, and the bridge state. In a load cell production process, state information matrices in different temperatures and different loads are recorded. A state information matrix threshold STH is obtained based on the specific analysis of sensor applications. In an actual application process of the load cell, the state information matrix St is compared with the threshold STH thereof to determine whether short-circuit or open-circuit occurs in the strain bridge 101 composed of the resistive strain gauges; whether short-circuit or open-circuit occurs in the temperature sensing element, whether asymmetry of strain gauge outputs due to various factors such as mechanical damages and overload fatigue of the sensor exists, and other fault phenomena, thereby implementing an intelligent diagnosis of state information.

Preferably, the temperature sensing resistance element 105 is a nickel-platinum resistor. By way of example rather than limitation, other types of temperature sensors may also be used to implement similar functions. In this instance, the temperature sensing element is connected in series to the Wheatstone bridge composed of the resistive strain gauges to form the complete strain bridge 101. Optionally, the temperature sensing element and the Wheatstone bridge composed of the resistive strain gauges may be separately excited, and this can also implement a similar intelligent diagnosis function.

Preferably, the digital load cell 100 further includes a power supply module 111. The state monitoring circuit 104 includes a power supply monitoring circuit 108. The power supply monitoring circuit 108 monitors an input voltage and an output voltage of the power supply module 111 by means of an ADC 3 and an ADC 4 to determine an input status and an output status of the operating power supply module 111 of the digital load cell 100, and sends the result to the signal processor 103. The power supply monitoring circuit 108 ensures that the signal processor 103 operates within an effective level range by detecting the input status and the output status of the power supply module 111.

Preferably, the state monitoring circuit 104 further includes a monitoring circuit 109 for the strain bridge 101. The monitoring circuit 109 for the strain bridge 101 monitors an excitation voltage of the strain bridge 101 by means of an ADC 2, so as to ensure that the analog-to-digital conversion circuit 102 operates within an effective level range.

Preferably, the state monitoring circuit 104 further includes a reference load circuit 110. The reference load circuit 110 is composed of electronic components with stable performance, mainly including a reference load 112 and an ADC 5. The reference load circuit 110 allows the analog-to-digital conversion circuit 102 to be switched to the reference load circuit 110, and then corrects and detects the analog-to-digital conversion circuit 102.

According to the digital load cell 100 provided in the present invention, a resistive strain gauge is firmly adhered to a force measuring region of the digital load cell 100. When a load is applied to the digital load cell 100, a micro strain is generated in the force measuring region, the resistive strain gauge deforms accordingly, and a corresponding resistance changes regularly. According to the principle of Wheatstone bridge, the resistive strain gauges are connected and are driven by using a voltage source, thereby converting a load force applied to the digital load cell 100 into a differential voltage signal to be output. After undergoing filtering, amplification, and analog-to-digital conversion, the output differential voltage signal is converted into weighing information (feedback signal). Analog-to-digital conversion is performed on related voltage signals to obtain state information. After being designed and manufactured according to a certain principle, the electronic load cell has good repeatability and ensures the consistency between load information, weighing data information, and state information of the electronic load cell. The consistency between the load information and the weighing data information of the electronic load cell ensures that the digital weighing data can truly reflect a load force condition of the electronic load cell. Due to the consistency between the weighing data information and the state information, the two are detected by using a digital algorithm and are compared with a preset threshold to obtain real-time state information of the electronic load cell, such as whether a fault such as short-circuit or open-circuit occurs in the bridge composed of the resistive strain gauges, whether a fault such as short-circuit or open-circuit occurs in the temperature sensing element, or whether asymmetry of strain gauge outputs due to various factors such as mechanical damages and overload fatigue of the sensor exists.

Figure 2:
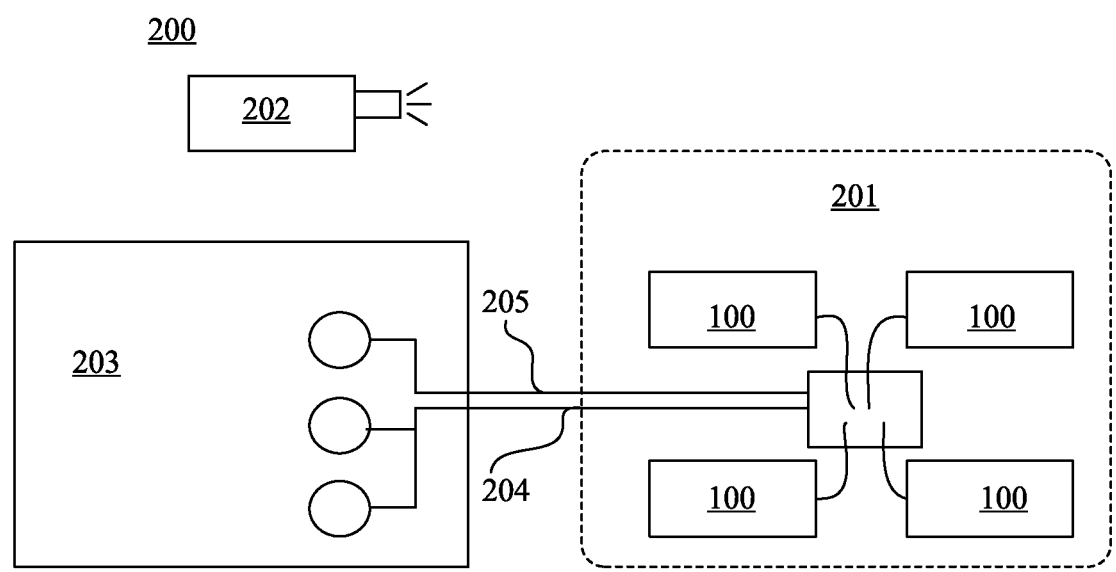
FIG. 2 is a schematic structural diagram of a weighing system according to an embodiment of the present invention.

FIG. 2 is a schematic structural diagram of a weighing system according to an embodiment of the present invention. As shown in the figure, the present invention further provides the weighing system 200 that mainly includes a load cell array 201, a collection device 202, and a control terminal 203.

The load cell array 201 includes a plurality of digital load cells 100 described above.

The collection device 202 is configured to collect environmental information of the load cell array 201. The collection device 202 includes a monitoring device and a built-in circuit. The environmental information includes an arrangement position of each digital load cell 100 in the load cell array 201, a weighted object type, and time information.

The control terminal 203 is connected to each electronic load cell in the load cell array 201 via a signal cable 204 to obtain a load force value Fn and state information matrix St of the electronic load cell. The control terminal 203 receives the environmental information collected by the collection device 202. The control terminal 203 establishes a weighing process database based on the environmental information, the load force value Fn of each digital load cell 100, and the state information matrix St.

Preferably, the weighing system 200 further includes a power cable 205. The control terminal 203 is connected to the load cell array 201 via the power cable 205. Specifically, the control terminal 203 supplies power to the digital load cell 100 in the load cell array 201 via the power cable 205.

Preferably, the control terminal 203 includes a cable monitoring unit (not shown in the figure). The cable monitoring unit is configured to monitor a current and a resistance of the power cable 205, and the cable monitoring unit is configured to monitor a voltage and an impedance of the signal cable 204. The control terminal 203 determines a status of the power cable 205 and a status of the signal cable 204 based on the environmental information collected by the collection device 202 and a detection signal of the cable detection unit.

In actual applications, when the electronic load cells are connected topologically in a wired manner, various types of cables are usually used for connection, but in practice, it is found that many faults are sourced from cable failures and cable connection failures. The internal core wires of the cables used by the weighing system 200 can be defined as the power cable 205 and the data signal cable 204 depending on use. In order to exclude signal errors caused by cable failures or cable connection failures, in the present invention, a circuit with the objective of electrical signal detection of features such as a real-time current, impedance, and amplitude value, and impedance detection is designed in the control terminal 203. A current of the power cable 205 is detected in real time and compared with key information such as a current threshold and the number of sensors, so that it can be determined and pre-warned whether there is a failure such as damage or short-circuit in the power cable 205. Generally, interfaces of the data signal cable 204 are of high configuration, and accordingly, it makes no actual sense to directly measure a current of the signal cable 204. In the present invention, electrical signal levels of features such as impedance and amplitude of the data signal cable 204 are tested, and in combination with information such as a topological structure of a communication network and the number of sensors, diagnosis and analysis and a pre-warning prompt for a status of the data signal cable 204 are implemented.

In this embodiment of the present invention, the control terminal supplies power to the electronic load cell in the load cell array via the power cable, and receives a signal of the electronic load cell via the signal cable. The control terminal includes a cable monitoring unit, where the cable monitoring unit detects a current and an impedance of the power cable, and the cable detection unit further detects a voltage and an impedance of the signal cable. The control terminal determines a status of the power cable and a status of the signal cable based on external information collected by the collection device and a detection signal of the cable detection unit. The control terminal establishes a weighing process database based on the external information, the load force value Fn of each electronic load cell, and the state information matrix St. Based on the weighing process database, the control terminal can implement the following monitoring functions:

a) Based on a preset overload threshold, when the electronic load cell is overloaded, an overloaded load and moment are recorded. The recorded values thereof may be stored in the electronic load cell and sent to the control terminal for storage, for monitoring the usage of the weighing system, and providing an analysis basis when the electronic load cell is faulty.

b) Based on a preset effective load threshold, the electronic load cell records effective weighing times, provides service life state information of an electronic load cell node in combination with a life prediction algorithm based on a fatigue limit theory and experimental data and by taking into account the overload times and frequency, and gives pre-warning information when the fatigue service life approaches.

c) The control terminal analyses and records information such as a weighing time, frequency, and total quantity of a weighted object type, and summarizes and analyses the weighing moment, frequency, weight level, overload times, and total quantity of weighing and other information about different weighed object types, thereby obtaining important information about a system user usage process.

d) Installation positions of the electronic load cells in the weighing system are different. According to basic physics principle analysis, weighing data of each electronic load cell is related to the installation position thereof, and thus the obtained weighing data is also different. On the premise that there is symmetry in the installation positions of the electronic load cells, weighing data thereof also has numerical symmetry determined by the position symmetry. The control terminal analyses and records the weighing data and position parameters of the electronic load cells, and then can monitor and diagnose a use status of the weighing system.

e) The cable monitoring unit of the control terminal monitors a voltage of a signal transmitted by a signal cable in communication cables, then detects and analyses a communication signal from a physical layer perspective, and monitors problems such as damage, short-circuit, and mistaken grounding which may exist in the signal cable network.

f) In the process of communicating with the digital sensor, the control terminal monitors and analyses important information such as the real-time nature, the number of retransmissions, and the number of error codes of communication data transmission, and analyses obtained voltage information and data characteristic information by using a digital algorithm based on the network communication principle and specific applications, thereby obtaining state information of a communication system for state diagnosis and pre-warning prompt.

g) A cable monitoring unit is integrated in the control terminal to perform real-time current detection and electrical signal detection of features such as an impedance and an amplitude. A current of the power cable is detected in real time and compared with key information such as a current threshold and the number of sensors, so that it can be determined and pre-warned whether there is a failure such as damage or short-circuit in the power cable. Electrical signals of features such as impedance and level amplitude of the signal cable are tested, and in combination with information such as a topological structure of a communication network and the number of sensors, diagnosis and analysis and a pre-warning prompt for a status of the data signal cable are implemented.

The electronic load cell and the weighing system provided in the present invention can monitor and analyse a load status, a use process, health conditions, and a service life of the weighing system composed of digital load cells, and diagnose, analyse, and record information such as a network status, node information, a communication status, etc. of the weighing system, so as to ensure the reliability and precision of the weighing system.

It can be apparent for a person skilled in the art that various modifications and variations may be made to the exemplary embodiments of the present invention without departing from the spirit and scope of the present invention. Therefore, it is intended that the present invention covers the modifications and variations of the present invention that fall within the scope of the appended claims and their equivalents.

The invention claimed is:

1. A digital load cell, comprising:
a strain bridge comprising a Wheatstone bridge formed by connecting four resistive strain gauges and a temperature sensing resistance element connected in series to the Wheatstone bridge;
an analog-to-digital conversion circuit configured to excite the strain bridge, wherein the analog-to-digital conversion circuit comprises a plurality of input channels and an output terminal, the input channels are configured to receive feedback signals from the strain bridge, and the output terminal is configured to output the feedback signals after analog-to-digital conversion;
a signal processor comprising a load force calculation unit and a state information matrix calculation unit, wherein the load force calculation unit is configured to calculate a differential voltage and a compensation function based on the feedback signals obtained from the output terminal of the analog-to-digital conversion circuit, and is configured to calculate a load force value based on the differential voltage and the compensation function, and the state information matrix calculation unit is configured to calculate real-time voltage values of the four resistive strain gauges based on the feedback signals obtained from the output terminal of the analog-to-digital conversion circuit, and is configured to calculate a state information matrix based on the real-time voltage values and the load force value; and a state monitoring circuit configured to obtain and transfer state monitoring information of the digital load cell to the signal processor;
wherein the state monitoring circuit comprises a strain bridge monitoring circuit, and the strain bridge monitoring circuit is configured to monitor an excitation voltage of the strain bridge;
wherein the state monitoring circuit comprises a reference load circuit, so that the analog-to-digital conversion circuit is configured to be switched switching to the reference load circuit.

2. The digital load cell according to claim 1, wherein:
the analog-to-digital conversion circuit has a reference voltage terminal and a ground terminal; and
the analog-to-digital conversion circuit excites the strain bridge via the reference voltage terminal and the ground terminal.

3. The digital load cell according to claim 1, wherein:
the Wheatstone bridge comprises a first strain gauge, a second strain gauge, a third strain gauge, and a fourth strain gauge;
the analog-to-digital conversion circuit comprises at least a first input channel, a second input channel, and a third input channel;
a first feedback signal is drawn out between the temperature sensing resistance element and the Wheatstone bridge and input to the first input channel when the digital load cell is operated;
a second feedback signal is drawn out between the first strain gauge and the second strain gauge and input to the second input channel when the digital load cell is operated; and
a third feedback signal is drawn out between the third strain gauge and the fourth strain gauge and input to the third input channel when the digital load cell is operated.

4. The digital load cell according to claim 3, wherein the load force calculation unit is configured to calculate the differential voltage VS=VSP−VSN based on the second feedback signal VSP and the third feedback signal VSN, is configured to calculate the compensation function f (VBG, VSP, VSN) based on the first feedback signal VBG, the second feedback signal VSP, and the third feedback signal VSN, and is configured to calculate the load force value Fn=(VSP−VSN)*K+f (VBG, VSP, VSN) based on the differential voltage and the compensation function, where K is a strain force coefficient constant of the digital load cell.

5. The digital load cell according to claim 4, wherein the state information matrix calculation unit is configured to calculate the real-time voltage values of the four resistive strain gauges based on the first feedback signal VBG, the second feedback signal VSP, and the third feedback signal VSN, and is configured to calculate the state information matrix St=Matrix (VSP, VSN, VBG, Fn, T, Sn) based on the real-time voltage values and the load force value Fn, the real-time temperature information T, and the state monitoring information Sn sent by the state monitoring circuit.

6. The digital load cell according to claim 5, wherein the signal processor further comprises a state information matrix threshold database, the state information matrix threshold database comprises state information matrix thresholds STH corresponding to different application states of the digital load cell, and the signal processor is configured to compare the state information matrix St with the state information matrix thresholds STH to obtain fault information of the digital load cell.

7. The digital load cell according to claim 6, wherein the signal processor is configured to detect a current state of the digital load cell based on the load force value Fn and the state information matrix St, and is configured to correct a deviation between the load force value Fn and an actual load force value generated due to the current state.

8. A weighing system, comprising:
- a load cell array comprising a plurality of digital load cells according to claim 5;
- a collection device configured to collect environmental information of the load cell array, wherein the collection device comprises a monitoring device and a built-in circuit; and
- a control terminal connected to each electronic load cell in the load cell array via a signal cable configured to obtain a load force value Fn and a state information matrix St of the electronic load cell, wherein the control terminal is configured to receive the environmental information collected by the collection device.

9. The weighing system according to claim 8, further comprising a power cable, wherein the control terminal is connected to the load cell array via the power cable.

10. The weighing system according to claim 9, wherein the control terminal comprises a cable monitoring unit, wherein the cable monitoring unit is configured to monitor a current and ca resistance of the power cable, and the cable monitoring unit is configured to monitor a voltage and an impedance of the signal cable.

11. The digital load cell according to claim 1, further comprising a power supply module, wherein the state monitoring circuit comprises a power supply monitoring circuit, and the power supply monitoring circuit monitors an input voltage and an output voltage of the power supply module.

* * * * *